United States Patent [19]

Schneider et al.

[11] Patent Number: 5,521,497
[45] Date of Patent: May 28, 1996

[54] MEASURING ARRANGEMENT FOR CONTACTLESSLY DETECTING THE DISTANCE BETWEEN TWO COMPONENTS

[75] Inventors: Eckhard Schneider, Lehrte; Hans-Jürgen Diekmann, Hanover, both of Germany

[73] Assignee: Continental Aktiengesellschaft, Hanover, Germany

[21] Appl. No.: 418,449

[22] Filed: Apr. 7, 1995

[30] Foreign Application Priority Data

Apr. 18, 1994 [DE] Germany .......................... 44 13 341.3

[51] Int. Cl.$^6$ .............. G01B 7/14; B60G 17/00
[52] U.S. Cl. ............... 324/207.22; 267/64.19; 280/6.1; 324/207.14; 324/207.24; 324/207.26
[58] Field of Search ............ 324/207.14, 207.15, 324/207.2, 207.21, 207.22, 207.24, 207.26; 267/64.16, 64.19; 280/840, 6.1

[56] References Cited

U.S. PATENT DOCUMENTS

| 4,517,514 | 5/1985  | Howell ........................ 324/207.15 |
| 4,555,120 | 11/1985 | Frait et al. .................... 280/6.1 |
| 4,783,089 | 11/1988 | Hamilton et al. ............. 280/6.1 X |
| 4,853,630 | 8/1989  | Houston ........................ 324/207.22 X |
| 5,045,785 | 9/1991  | Hansen .......................... 324/207.24 X |
| 5,142,225 | 8/1992  | Gerlach et al. . |

FOREIGN PATENT DOCUMENTS

| 3726923 | 3/1988 | Germany . |
| 3940819 | 6/1991 | Germany . |

Primary Examiner—Gerard R. Strecker
Attorney, Agent, or Firm—Walter Ottesen

[57] ABSTRACT

The invention is directed to a measuring arrangement which is mounted to detect, without contact, the distance between two components which are movable relative to each other. A component 22 has at least one magnet 25 in order to obtain, with less technical complexity, a signal substantially free of noise. The other component 23 has the magnetic field sensor 28 which is surrounded by a magnet arrangement 27 and is mounted asymmetrically to this magnet arrangement. The magnetic field sensor 28 is disposed above the exit plane E of the field lines of the magnet arrangement 27. The changes of the magnetic field detected by the magnetic field sensor 28 are converted in a signal processing unit (31, 32) into a proportional electrical control signal.

4 Claims, 2 Drawing Sheets

MEASURING ARRANGEMENT FOR CONTACTLESSLY DETECTING THE DISTANCE BETWEEN TWO COMPONENTS

FIELD OF THE INVENTION

The invention relates to a measuring arrangement having a magnetic field sensor for contactlessly detecting the distance between two components which move relative to each other.

BACKGROUND OF THE INVENTION

In the manufacture of motor vehicles, there is a need to sense movable parts in order to detect, for example, the distance between the axle body and the vehicle body at any particular time. For this purpose, distance sensors are necessary. The sensor should detect the distance between the two reference points without contact in order that the sensing takes place without being affected.

Distance sensors are also needed for air springs having elastomeric air-spring flexible members for spring supporting components. The distance sensors are here used to control the level of the air springs.

It is known to effect the control of elevation for obtaining an equalized vehicle level for different load conditions utilizing an electronic elevation sensor with the aid of a pair of opposing conical springs in the interior of a flexible member of an air spring. The conical spiral springs are deflected in the axial direction during compression. The springs are electrically connected to each other on one of the connecting plates with which the air spring is connected to a vehicle frame and an axle assembly of the vehicle. The evaluation electronics and the connections for the two other spring ends are on the other plate. A change of the length of the spring effects a corresponding change in the electrical inductance which is converted to a distance signal. An elevation sensor of this kind is, however, very complex The above-described sensor and the air spring are described in the product sheet entitled "ContiTech Luftfedersysteme mit integriertem Höhensensor" published by ContiTech Luftfedersysteme GmbH of Hannover, Germany (1992).

SUMMARY OF THE INVENTION

It is an object of the invention to provide a contactless distance sensor which is characterized by less technical complexity and by providing a noise-free signal.

The measuring arrangement of the invention is for detecting, without contact, the distance between first and second components, the first and second components being movable relative to each other thereby causing the distance to vary. The measuring arrangement includes: a magnetic field sensor for detecting changes in magnetic field intensity and for producing a signal indicative of the changes; first magnet means mounted on the first component for providing a first magnetic field; second magnet means mounted on the second component for providing a second magnetic field superposed on the first magnetic field to form a composite magnetic field having a field intensity which changes as the first and second components move relative to each other thereby varying the distance; the magnetic field sensor being mounted on the second component so as to be located asymmetrically with respect to the second magnet means; the second magnet means defining an exit face from which the second magnetic field emanates and being arranged on the second component so as to be in surrounding relationship to the magnetic field sensor; the magnetic field sensor being further mounted on the second component so as to extend beyond the exit face whereby the magnetic field sensor detects the changes in the field intensity of the composite magnetic field; and, signal processing means connected to the magnetic field sensor for receiving the signal and for converting the signal into a control signal.

The components which are movable relative to each other are equipped with an assembly of magnets. These magnets are advantageously mounted on separate mounting plates. The distance between the two magnet arrangements is detected, without contact, by the magnetic field sensor because the changing distance of the components to each other greatly changes the intensity of the field lines thereby influencing the electrical state of the sensor.

According to an advantageous embodiment of the invention, the magnet arrangement includes a closed ring enclosing the magnetic field sensor which is mounted asymmetrically with respect to the closed ring. In this way, an improved shielding of the magnetic field sensor and a higher magnetic field line density is obtained.

The invention can be used for detecting, without contact, the distance between a vehicle axle and the vehicle body of a motor vehicle. The magnetic field sensor is acted upon by the change of magnetic field line density and is well suited for the rough operation to which a motor vehicle is continuously subjected. The magnetic field sensor is well suited in this context because it senses without contact. Even under the greatest load of the motor vehicle, a reliable distance signal is obtained via the magnetic measuring arrangement of the invention. This distance signal is proportional to the instantaneous distance between vehicle axle and vehicle body.

The measuring arrangement of the invention is also applicable for sensing the spacing of the components to which an elastomeric flexible member of an air spring is connected. The measuring arrangement according to the invention is characterized by a simpler configuration and provides a signal with greater reliability when compared to known distance sensing devices for air springs.

According to another embodiment of the invention, the magnets and magnetic field sensor are arranged in the interior space of an air spring flexible member and are mounted on the connecting parts of the air spring. This configuration protects the measuring arrangement against ambient influences and prevents, for example, contamination. Furthermore, it is advantageous to manipulate and assemble an air spring configured in this manner as an already complete component.

BRIEF DESCRIPTION OF THE DRAWINGS

The invention will now be described with reference to the drawings wherein.

DESCRIPTION OF THE PREFERRED EMBODIMENTS OF THE INVENTION

Figure 4:
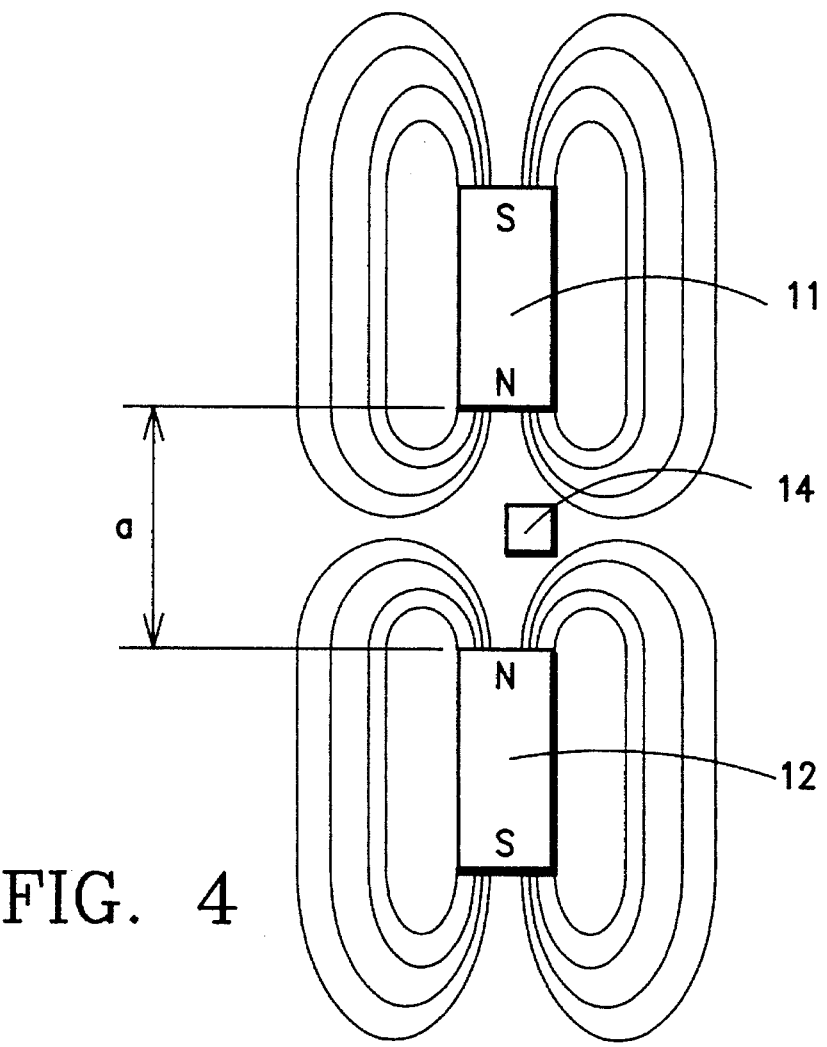
FIG. 4 is a schematic showing the principle on which the measuring arrangement of the invention operates; and, FIG. 5 is a block circuit diagram of a sensor circuit.

FIG. 4 is a schematic showing the physical principle on which the contactless distance measuring arrangement according to the invention is based. Two permanent magnets 11 and 12 are mounted so that they lie opposite each other with the same magnetic polarity. In this way, a repulsion of their magnetic field lines results as shown. A magnetic field sensor 14 is mounted asymmetrically within the field lines and detects the intensity of the magnetic field at the position where it is located. If the spacing (a) between the permanent magnets 11 and 12 is changed, then the intensity of the superposed field lines changes at the magnetic field sensor 14. This change of intensity is detected by the magnetic field sensor 14 and is supplied as an electrical variable to a signal processing unit for obtaining a control signal as will be explained below. The change of the magnetic field intensity is proportional to the change of the distance (a) between the permanent magnets 11 and 12.

Figure 1:
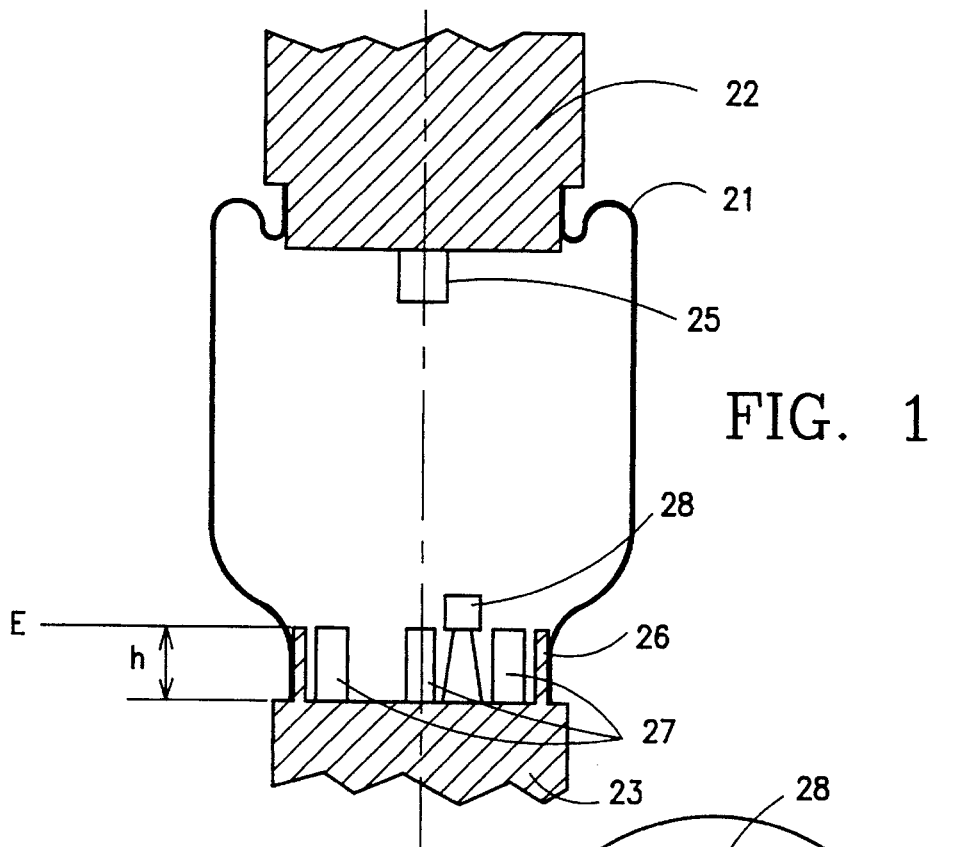
FIG. 1 is a schematic of a contactless measuring arrangement in an air spring.
Figure 2:
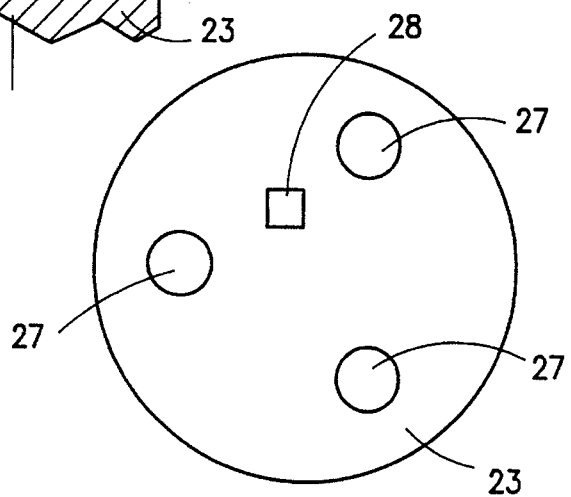
FIG. 2 is a plan view of the measuring surface of a component on which the magnetic field sensor is mounted.

An air spring is shown in FIG. 1 equipped with a flexible member 21 made of elastomeric material. The flexible member 21 is tightly clamped at its two ends to two components 22 and 23, respectively. The components 22 and 23 move relative to each other. The air spring flexible member 21 is maintained at an overpressure in the conventional manner to suspend the masses with respect to each other. The distance present between the two components (22, 23) is to be held constant. This is effected by driving a level control valve which controls the air metered to the flexible member 21 and the air drawn away therefrom.

Component 22 is configured as a roll-off piston and a centrally mounted permanent magnet 25 is located on the end face of component 22. The magnet 25 can, for example, be a rod-shaped magnet as shown and can have any desired cross section. The opposite-lying component 23 has a collar 26 mounted on its end face. The collar 26 has an elevation (h) and delimits a circular surface in which three permanent magnets 27 are mounted at equal distances from each other. A magnetic field sensor 28 is arranged asymmetrically within the triangle defined by the three permanent magnets 27. The polarities of the permanent magnets (25, 27) of the roll-off piston 22 and of the component 23 are configured as shown in FIG. 4.

The magnetic field sensor 28 is arranged above the field line exit plane E of the permanent magnet 27 in order to ensure sensing in the region of the field lines which change greatly because of the changing distance between the components 22 and 23. The selected position of the magnetic field sensor 28 within the superposed field lines of the permanent magnet 27 leads to a shielding of the magnetic field sensor 28 against external magnetic disturbing influences and ensures a high immunity of the system to noise. Furthermore, the asymmetric arrangement of the magnetic field sensor 28 ensures that a superposition of field lines takes place at the location of the sensor which can be evaluated as a change of field intensity. This is the case also where distance changes occur with a lateral offset from the axis of symmetry.

Figure 3:
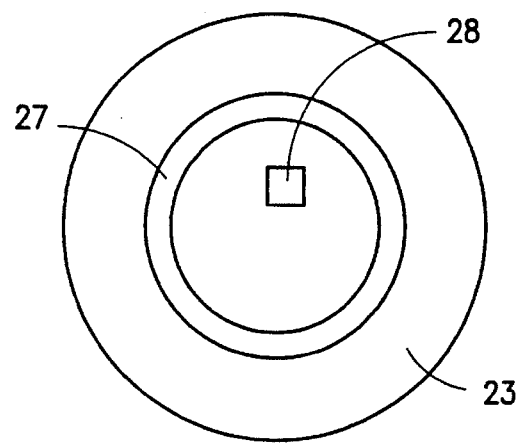
FIG. 3 is a modified embodiment of an arrangement of the magnets with the magnetic field sensor mounted asymmetrically relative thereto.

In FIG. 3, the magnet arrangement on the component 23 is shown as an annular-shaped permanent magnet and the magnetic field sensor 28 is mounted asymmetrically in the circle defined by the permanent magnet.

The permanent magnet 27 is magnetized parallelly to the vertical axis which extends perpendicularly to the plane of the drawing in FIG. 3.

The magnetic field sensor 28 can have various configurations. Thus, the magnetic field sensor 28 can be a field plate, a Hall generator, a reluctance sensor or a flux gate magnetic field sensor. The magnetic field sensor 28 can be present on a microchip (integrated circuit) and the microchip can also accommodate the signal processing unit.

Figure 5:
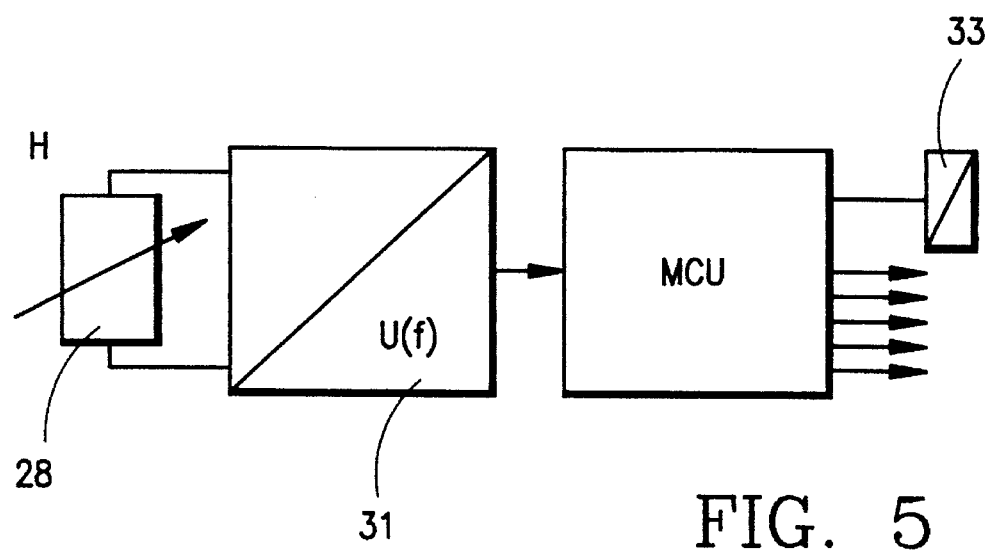

The signal processing unit of the measuring arrangement is shown in FIG. 5. The magnetic field intensity H is converted into a voltage U or into a square wave signal having the frequency (f) in the preprocessing unit 31 connected to the magnetic field sensor 28. This signal is then converted by a microcontroller 32 into corresponding control signals for the magnetic valves 33 and the air compressor so that a distance change between the components 22 and 23, which move relative to each other, is compensated by supplying air or withdrawing air.

It is understood that the foregoing description is that of the preferred embodiments of the invention and that various changes and modifications may be made thereto without departing from the spirit and scope of the invention as defined in the appended claims.

What is claimed is:

1. A measuring arrangement for contactlessly detecting the distance between first and second components, the first and second components being movable relative to each other thereby causing said distance to vary, the measuring arrangement comprising:

a magnetic field sensor for detecting changes in magnetic field intensity and for producing a signal indicative of said changes;

first magnet means mounted on said first component for providing a first magnetic field;

second magnet means mounted on said second component for providing a second magnetic field superposed on said first magnetic field to form a composite magnetic field having a field intensity which changes as said first and second components move relative to each other thereby varying said distance;

said magnetic field sensor being mounted on said second component so as to be located asymmetrically with respect to said second magnet means;

said second magnet means defining an exit face from which said second magnetic field emanates and being arranged on said second component so as to be in surrounding relationship to said magnetic field sensor;

said magnetic field sensor being further mounted on said second component so as to extend beyond said exit face whereby said magnetic field sensor detects said changes in said field intensity of said composite magnetic field; and, signal processing means connected to said magnetic field sensor for receiving said signal and for converting said signal into a control signal.

2. The measuring arrangement of claim 1, said second magnet means comprising a closed annular member mounted on said second component.

3. The measuring arrangement of claim 1, wherein said first component is a vehicle axle and said second component is a vehicle body of a motor vehicle.

4. An air spring comprising:

a first component and a second component conjointly defining a distance therebetween;

said first and second components being movable relative to each other thereby causing said distance to vary;

an air-spring flexible member connected between said first and second components and defining an interior space between said components; and, a measuring arrangement for contactlessly detecting said distance between said first and second components, the measuring arrangement being mounted in said interior space and including: a magnetic field sensor for detecting changes in magnetic field intensity and for producing a signal indicative of said changes; first magnet means mounted on said first component for providing a first magnetic field; second magnet means mounted on said second component for providing a second magnetic field superposed on said first magnetic field to form a composite magnetic field having a field intensity which changes as said first and second components move relative to each other thereby varying said distance; said magnetic field sensor being mounted on said second component so as to be located asymmetrically with respect to said second magnet means; said second magnet means defining an exit face from which said second magnetic field emanates and being arranged on said second component so as to be in surrounding relationship to said magnetic field sensor; said magnetic field sensor being further mounted on said second component so as to extend beyond said exit face whereby said magnetic field sensor detects said changes in said field intensity of said composite magnetic field; and, signal processing means connected to said magnetic field sensor for receiving said signal and for converting said signal into a control signal.

* * * * *